G. CONCATO.
SHOCK ABSORBER.
APPLICATION FILED AUG. 3, 1915.
1,200,314.
Patented Oct. 3, 1916.
3 SHEETS—SHEET 1.
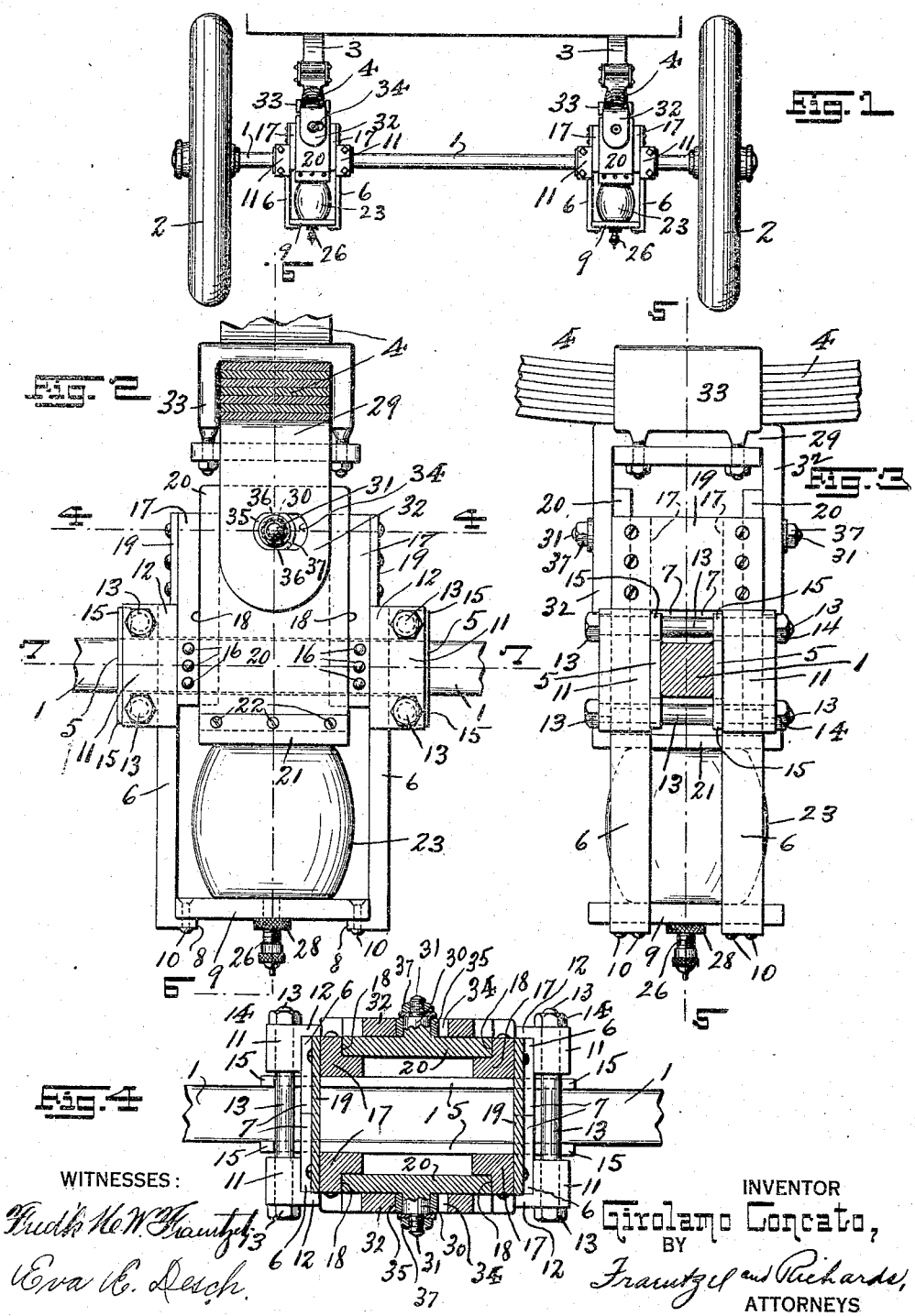
WITNESSES:
INVENTOR
Girolamo Concato,
BY
Frantzel and Richards,
ATTORNEYS G. CONCATO.
SHOCK ABSORBER.
APPLICATION FILED AUG. 3, 1915.
1,200,314.
Patented Oct. 3, 1916.
3 SHEETS—SHEET 2.
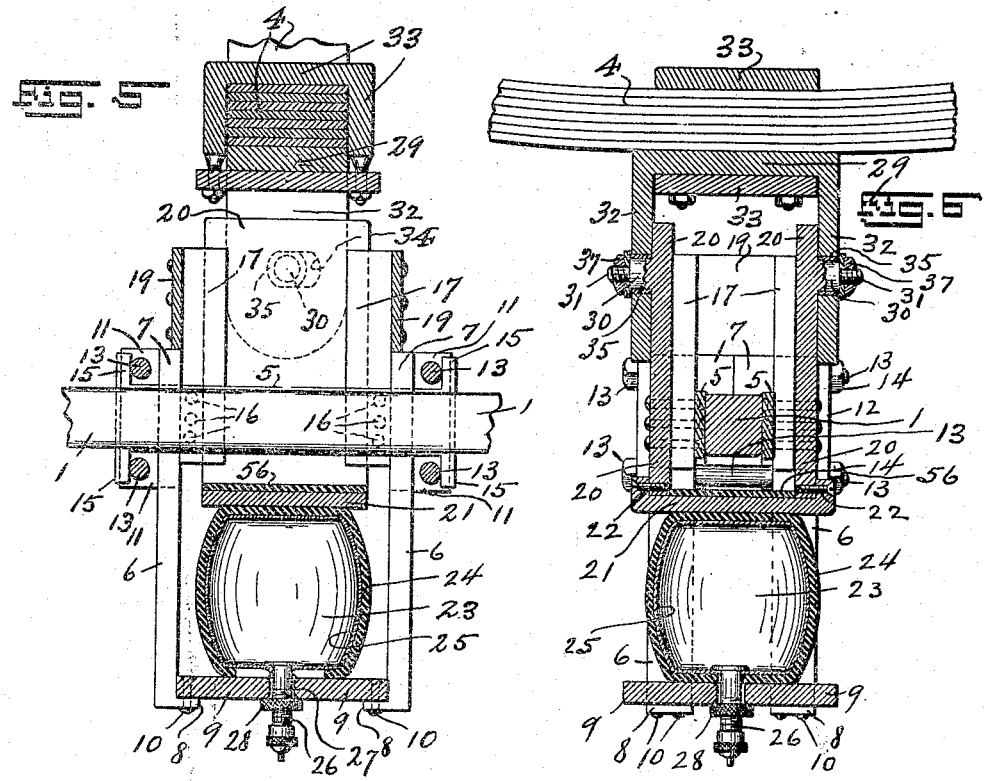
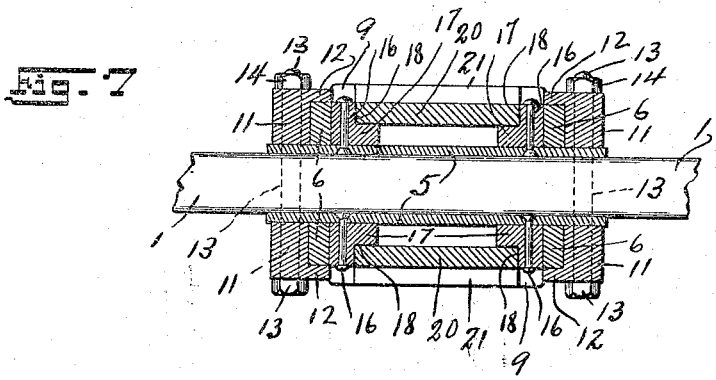
WITNESSES:
INVENTOR
Girolamo Concato,
BY
ATTORNEYS

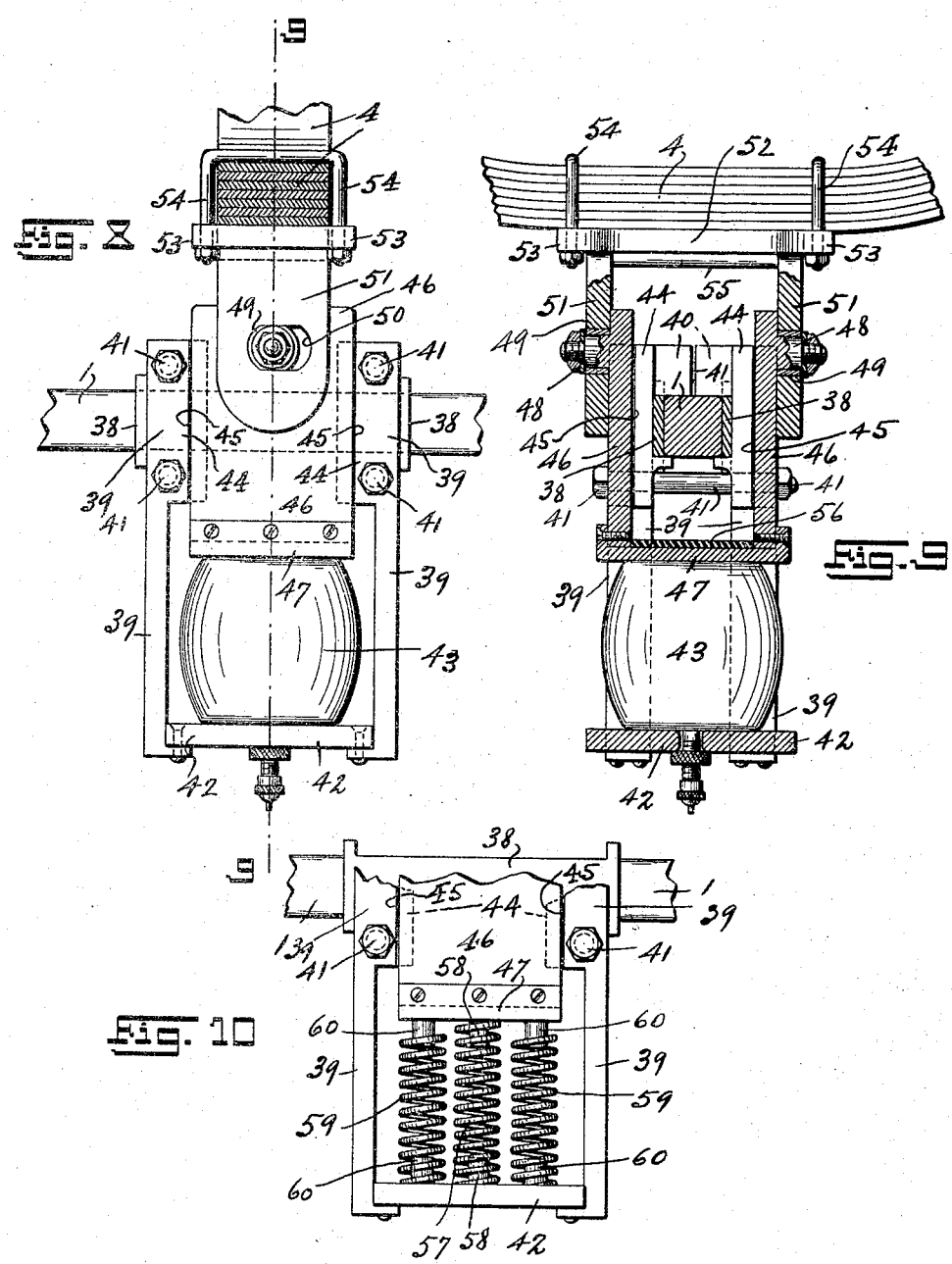

UNITED STATES PATENT OFFICE.

GIROLAMO CONCATO, OF BROOKLYN, NEW YORK.

SHOCK-ABSORBER.

1,200,314.  Specification of Letters Patent.  Patented Oct. 3, 1916.

Application filed August 3, 1915. Serial No. 43,372.

*To all whom it may concern:*

Be it known that I, GIROLAMO CONCATO, a subject of the King of Italy, residing at Brooklyn, in the county of Kings and State of New York, have invented certain new and useful Improvements in Shock-Absorbers; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in shock-absorbers for vehicles, and the invention relates, more particularly, to a novel and simple construction of shock-absorber for attachment to the axles of a vehicle, and more particularly for use on motor driven vehicles.

The invention has for its principal object to provide a strong, durable and efficient construction of shock-absorber, so arranged and mounted as to provide a full "floating" support or carriage of the vehicle chassis and body upon the axles, whereby undue vibration and shocks caused by the wheels of the vehicle traveling over rough and uneven road surfaces are greatly minimized and counteracted, and the rebound of depressed vehicle springs, such as are usually located between the chassis and body of the vehicle and the axles, are controlled and checked in such a manner as to steady their reaction to avoid sudden and violent movements of the vehicle body, thus rendering the latter comfortable and possessed of that desired quality known to those skilled in the art as "easy riding".

Other objects of the present invention, not at this time more particularly enumerated, will be clearly understood from the following detailed description of the present invention.

The invention consists, primarily, therefore in the novel construction of shock-absorber hereinafter more fully set forth; and, furthermore, this invention consists in the various arrangements and combinations of the several devices and parts, as well as in the details of the construction of the same, all of which will be more fully described in detail in the following specification, and then finally embodied in the claims which are appended to and which form an essential part of said specification.

The invention is clearly illustrated in the accompanying drawings, in which:—

Figure 1 is a detail front elevation of an axle and its wheels, and a spring supported chassis and body, illustrating my novel construction of shock-absorbers interposed between said axle and the springs of said chassis and body. Fig. 2 is a large detail front elevation of the novel shock-absorber made according to and embodying the principles of my present invention; Fig. 3 is a detail side elevation of the same; Fig. 4 is a horizontal section of the same, taken on line 4—4 in said Fig. 2, looking downward; Fig. 5 is a detail longitudinal section of the same, taken on line 5—5 in said Fig. 3; Fig. 6 is a transverse longitudinal section of the same, taken on line 6—6 in said Fig. 2; and Fig. 7 is another horizontal section of the same, taken on line 7—7 in said Fig. 2, looking downward. Fig. 8 is a front elevation of a slightly modified construction of shock-absorber made according to and embodying the principles of my present invention; and Fig. 9 is a longitudinal vertical section of the same, taken on line 9—9 in said Fig. 8. Fig. 10 is a detail front elevation of the lower end of my novel construction of shock-absorber, illustrating a slightly modified form of cushion member or buffer which may be used therewith.

Similar characters of reference are employed in all of the above described views to illustrate corresponding parts.

Referring now to the said drawings, the reference character 1 indicates an axle of a vehicle upon which the wheels 2 are supported, and the reference character 3 indicates the chassis of the vehicle, and 4 the usual steel springs for resiliently supporting said chassis 3.

My novel construction of shock-absorber comprises a pair of side plates 5, which are laid so as to extend longitudinally against the sides of the axle 1.

The reference character 6 indicates hanger-irons, which are arranged in pairs spaced longitudinally from each other so as to extend over the side-plates 5, and thus depend from opposite sides of said axle 1. Each hanger-iron 6 is provided at its upper end with a laterally extending hanger-lug 7 which extends over the upper surface of the axle 1 and in engagement therewith, so that said hanger-irons may be positively suspended from and supported by said axle 1. Each hanger-iron 6 is further provided at its lower extremity with inwardly and laterally projecting carrying lugs 8, so arranged that a base or bottom plate 9 may be supported thereon, and secured thereto by means of rivets 10, or any other suitable fastening means, thus suspending from and beneath the axle 1, in a stationary and horizontal position, said base or bottom plate 9. Said side-plates 5 and hanger-irons 6, when normally positioned upon said axle 1, are rigidly bound thereto by means of clip-irons 11, which extend vertically over each end of said side-plates 5, and which are provided with marginally projecting binding-lips 12 which engage the outer sides of said hanger-irons 6, and thus hold the same in properly related positions over said side-plates 5 and axle 1.

Each pair of oppositely disposed clip-irons 11 are secured in place, and pressed toward each other, and in holding or gripping engagement with the respective side-plates and hanger-irons by means of bolts 13 and nuts 14, the former passing through the ends of said clip-irons so as to draw the same together, one of said bolts 13 passing above the axle 1, and the other of said bolts 13 passing beneath the axle 1.

Each end of each side-plate 5 is provided with oppositely extending ears 15, which engage the outer sides of said bolts 13, and thus tend to prevent any longitudinal movement or slip of said side-plates 5 upon the axle 1.

By virtue of the above described means for connecting and securing said side-plates 5 and hanger-irons 6 to the axle 1, the same are rigidly secured or bound to said axle 1 without necessity of weakening the latter by bolt-holes, or otherwise cutting away any part of said axle. It must be understood, however, that I do not restrict myself to the form of fastening means above described, since various arrangements and forms of fastening means may be made and employed.

Secured to each side-plate 5, by means of rivets 16, or any other suitable fastening means, are a pair of vertically and upwardly extending angle-irons forming guide-members 17, the angular groove 18 formed in one face thereof providing a slideway for purposes subsequently to be disclosed. The laterally opposite guide-members 17 are braced and rigidly secured by means of a laterally extending tie-plate 19, which is riveted or otherwise secured thereto so as to interconnect the same. While I have shown said guide-members 17 as separate pieces, it must be understood that, if it is so desired the same may be made to form an integral part of and extension of said hanger-irons 6, as I have shown in the modified constructions illustrated by Figs. 8 and 9 of the drawings, and which will hereafter be more particularly described.

Arranged to slide between longitudinally opposite guide-members 17 are vertically movable slide-plates 20, one on each side of the axle 1. The lower ends of said slide-plates 20 are connected together by a horizontally extending foot-plate 21, secured to said slide-plate by any suitable means, such, for example, as the screws 22, or if desired said foot-plate may be made to form an integral part of said slide-plates. Seated upon said stationary base or bottom plate 9, so that its upper end may be engaged by said foot-plate 21, is a pneumatic cushion or resilient buffer member 23, the outer casing 24 of which may be constructed of any suitable material having the requisite degree of flexibility, and within which outer casing 24 may be placed an inner air-tight member or container 25 having a suitable valve-member 26 through which air may be introduced to the same, so that the whole cushion or resilient buffer-member 23 may be inflated to the desired degree of air-pressure, whereby the desired degree of pneumatic resiliency may be obtained. Said valve-member 26 may pass downwardly through an opening 27 provided in said base or bottom-plate 9, and thus not only be readily accessible, but when secured in place by the lock-nut 28, may also serve to maintain said cushion or buffer-member immovably seated upon said base or bottom-plate 9.

The reference character 29 indicates a cradle member adapted to be pivotally connected to said slide-plates 20, so as to be capable of a slight oscillation or swing in a direction parallel to the axis of the axle 1. Each slide-plate 20 is provided with an outwardly projecting journal-stud 30, connected with the end of which is a screw-threaded shank 31 of slightly reduced diameter. Said cradle-member 29 is provided with downwardly extending side-arms 32 having suitably disposed openings in which said journal-studs 30 are received. The ordinary vehicle springs 4 are supported upon said cradle-member 29, and are suitably secured thereto by the usual anchor-yoke devices 33.

As illustrated in Fig. 1 of the accompanying drawings said shock-absorbers are arranged in pairs upon the axle 1, one adjacent to each vehicle wheel, and when so used in pairs, I have found it advisable to provide for a slight lateral movement of the slide-plates 20 of one shock-absorber relative to the cradle-member 29 connected therewith, and in addition to the oscillatory movement of the latter, and to this end the side-arms 32 of said cradle-member are provided with laterally elongated slots 34 in which are arranged tubular-sleeves 35, the exterior sides of which are flattened at the top and bottom to provide bearing surfaces 36 upon which said tubular sleeves 35 ride in their respective slots 34. The journal studs 30 are then inserted in said sleeves, and the latter are secured against escape by a nut and washer 37 arranged on the threaded shanks 31 of said journal-studs 30. When the wheel at one side of the vehicle, and at one end of the axle, passes over an obstruction in the road surface not met with by the other or opposite wheel at the opposite end of the axle, the former is raised higher than the latter and the result is that the axle is tilted from end to end, and in so tilting the axle may pivot on the journal stud of one shock-absorber so that the swing of the axle will cause the stud and sleeve of the opposite shock-absorber to ride laterally in the slots of said side-arms of the cradle member, and at the same time the pivoting action of the slide-plates 20 with relation to the cradle-members 29 of the shock-absorbers permits the inclination of the axle from end to end in either direction, and to a certain degree or limit without causing a corresponding inclination or sidewise tilt of the vehicle chassis and body, thus compensating for uneven road surface conditions and for one sided shocks, and permitting the vehicle body to ride substantially level under such conditions. As will be understood from an inspection of the drawings there is no rigid connection between the axle 1 and the springs 4 supporting the chassis and body of the vehicle, since the weight of the vehicle is carried on the pneumatic cushions or buffer-members 23, consequently the axle 1 has what I term a "floating" relation to the chassis and body. It therefore follows that as obstructions are met with by the wheels of the vehicle, or any unevenness of road surface, the consequent shock, jerk or pound of the axle 1 is not transmitted immediately and directly through the more or less stiff vehicle springs 4 to the chassis and body, but the rise or vertical movement of the axle 1 lifts the hanger-irons 6 and base or bottom-plate 9 carrying the effects of the shock or sudden upward movement to the pneumatic cushion or buffer-members 23, and the violence of the shock is absorbed and greatly diminished before transmission through the slide-plates 20 to the cradle-members 29, springs 4 and thence to chassis and body.

It will thus be apparent that not only are heavy shocks absorbed and diminished by my novel shock-absorbers before their effect can be transmitted to the vehicle body, but by virtue of the "floating" relation of the axles to the vehicle body, all the minor vibrations usually consequent upon traction are practically eliminated thus rendering the vehicle comfortable and stable as to its riding qualities. It will of course be also understood, that my novel shock-absorbers serve also to check any violent action of the ordinary vehicle springs 4, that is, movement of the springs toward the axle, since the force of such action is transmitted through the cradle-members 29 and slide-plates 20 to the pneumatic cushions or buffer-members 23, the consequent compression of which easily checks the violence of such spring action.

Referring now to Figs. 8 and 9 of the accompanying drawings, I have shown therein a slightly modified construction of my novel shock-absorber, the same operating in the same manner as already above described, and with the same advantages. In this construction I provide the side-plates 38 laid on opposite sides of said axle 1. The reference character 39 indicates hanger-irons having the hook-like elements or hanger-lugs 40 adapted to extend over the upper side of the axle 1 and support said hanger-irons in suspended or depending relation to said axle 1. In this construction I pass retaining bolts 41 directly through the body of said laterally opposite hanger-irons above and below the axle 1, so as to bind the same and said side-plates 38 to and upon the axle 1. The lower ends of the hanger-irons 39 support a base or bottom-plate 42, upon which is seated the pneumatic cushion or buffer-member 43. Integrally formed with each hanger-iron is a guide-member 44 having at its one edge a slideway 45. The reference character 46 indicates the slide-plates arranged for vertical movement in said slideways upon opposite sides of the axle 1, said slide-plates being connected at their lower ends by the foot-plate 47 which is supported upon the cushion or buffer-member 43. Each slide-plate has the outwardly projecting journal-stud 48 adapted to be received in the tubular-sleeves 49 slidably arranged in the lateral slots 50 of the side-arms 51 of a cradle-member 52, thus pivotally mounted upon and carried by said slide-plates. The outer upper marginal ends of said cradle-member 52 are provided with outwardly projecting perforated ears 53 adapted to receive the ends of the yoke-pieces 54, which bind upon said cradle-member the ordinary vehicle spring 4. In this arrangement and construction of my novel shock-absorber a simplified combined arrangement of hanger-irons and guide-members are provided, as well as a simple construction of fastening means for binding the same upon the axle 1. In this construction the cradle-member will pass downward between the guide-members in the event of injury and collapse of the pneumatic cushion or buffer member 43, and will come to rest directly upon the axle, instead of the tops or upper ends of said guide-members, and consequently the weight of the vehicle chassis and body will then be carried directly upon the axle 1 until repair or replacement of said cushion or buffer-member. In this connection it may be stated that a rubber, or leather, or any other suitable pad 55 may be inserted beneath the cradle member to prevent hammering upon the axle 1. It will also be noted that a similar pad 56 is carried upon the upper side of the foot-plate 21 of the first described construction and the foot-plate 47 of the modified construction to act as a buffer and sound deadener in the event the upward movement of the parts should carry the same in contact with the lower end of the guide-members or the axle 1.

Referring now to Fig. 10 of the drawings, I have shown in connection with the above described modified construction of shock-absorber, a spring cushion in place of a pneumatic cushion or buffer, the same comprising a central compression spring 57 carried on studs 58 respectively connected with said base or bottom-plate and said foot-plate and a pair of secondary compression springs 59 slightly shorter in length than said central spring, also carried on studs 60 respectively connected with said base or bottom-plate and said foot-plate. The central spring 57 acts as a buffer or cushion against the vibrations and lighter shocks, while the side springs 59 act only after compression of said central spring against the heavier shocks, as will be apparent. It will also be understood that such a spring constructed cushion may be substituted for the pneumatic cushion in the hereinabove first described construction of my novel shock-absorber.

Of course, the various forms of construction of the different parts of my novel shock-absorber may be widely varied, as well as the combinations and arrangements of such parts, hence I intend to claim the device generically, and do not limit myself to the precise construction of the details thereof, nor the precise arrangement and combination of the parts thereof. I therefore do not limit my invention to the exact arrangements and combinations of the various parts, or to the exact details of the construction of said parts, as described in the foregoing specification, nor as illustrated in the accompanying drawings.

I claim:—

1. A shock-absorber comprising a series of hanger-irons adapted to be rigidly connected with an axle so as to depend therefrom, a horizontal base-plate supported by the lower ends of said hanger-irons, a series of guide-members provided with slideways adapted to be rigidly connected with said axle so as to extend upwardly therefrom, a pair of slide-plates mounted between the slideways of longitudinally opposite guide-members so as to be vertically movable upon opposite sides of said axle, a horizontal foot-piece connecting the lower ends of said slide-plates, a resilient cushion or buffer member supported upon said base-plate and in turn supporting said foot-plate and said slide-plates, outwardly projecting journal studs connected with each slide-plate, a cradle-member having side-arms, said side-arms having laterally extending slots, tubular sleeves transversely slidable in said slots, said sleeves being journaled upon said journal studs for the purposes specified, and said cradle-member being adapted to be connected with and to support the ordinary springs of a vehicle body.

2. A shock-absorber comprising a pair of side-plates adapted to be laid upon longitudinally opposite sides of the axle of a vehicle, a series of hanger-irons adapted to extend transversely over said side-plates and depend downwardly from said axle, said hanger-irons having lateral hanger-lugs extending over and upon the top of the axle, means for clamping said hanger-irons and side-plates in position, a base-plate supported at the lower ends of said hanger-irons, a pneumatic cushion or buffer member carried upon said base-plate, guide-members having slideways rigidly connected with said side-plates and said hanger-irons, a pair of slide-plates mounted between slideways of longitudinally opposite guide-members so as to be vertically movable upon opposite sides of said axle, a horizontal foot-piece connecting the lower ends of said slide-plates and supported upon said pneumatic cushion or buffer-member, and means for supporting the body of a vehicle in connection with the upper ends of said slide-plates.

3. A shock-absorber comprising a pair of side-plates adapted to be laid upon longitudinally opposite sides of the axle of a vehicle, a series of hanger-irons adapted to extend transversely over said side-plates and depend downwardly from said axle, said hanger-irons having lateral hanger-lugs extending over and upon the top of the axle, means for clamping said hanger-irons and side-plates in position, a base-plate supported at the lower ends of said hanger-irons, a pneumatic cushion or buffer member carried upon said base-plate, guide-members having slideways rigidly connected with said side-plates and said hanger-irons, a pair of slide-plates mounted between slideways of longitudinally opposite guide-members so as to be vertically movable upon opposite sides of said axle, a horizontal foot-piece connecting the lower ends of said slide-plates and supported upon said pneumatic cushion or buffer-member, a cradle-member having side-arms pivotally connected with the upper ends of said slide-plates, said cradle-member being adapted to be connected with and to support the ordinary springs of a vehicle body.

4. A shock-absorber comprising a pair of side-plates adapted to be laid upon longitudinally opposite sides of the axle of a vehicle, a series of hanger-irons adapted to extend transversely over said side-plates and depend downwardly from said axle, said hanger-irons having lateral hanger-lugs extending over and upon the top of the axle, means for clamping said hanger-irons and side-plates in position, a base-plate supported at the lower ends of said hanger-irons, a pneumatic cushion or buffer-member carried upon said base-plate, guide-members having slideways rigidly connected with said side-plates and said hanger-irons, a pair of slide-plates mounted between slideways of longitudinally opposite guide-members so as to be vertically movable upon opposite sides of said axle, a horizontal foot-piece connecting the lower ends of said slide-plates and supported upon said pneumatic cushion or buffer-member, outwardly projecting journal studs connected with each slide-plate, a cradle-member having side-arms, said side-arms having laterally extending slots, tubular sleeves transversely slidable in said slots, said sleeves being journaled upon said journal studs for the purposes specified, and said cradle-member being adapted to be connected with and to support the ordinary springs of a vehicle body.

5. A pair of shock-absorbers for attachment to opposite ends of a vehicle axle, each shock-absorber comprising a housing rigidly connected with said axle, a cushion or buffer-member supported by said housing, guide-members connected with said housing, a vertically movable member slidably arranged between said guide-members and supported upon said cushion or buffer-member, a cradle-member pivoted to the vertically movable member of one shock-absorber so as to be capable of merely an oscillatory movement, and a cradle-member pivoted to the vertically movable member of the other shock-absorber so as to be capable of a limited lateral play in addition to its oscillatory movement.

In testimony, that I claim the invention set forth above I have hereunto set my hand this 24th day of July, 1915.

GIROLAMO CONCATO.

Witnesses:
GIROLAMO GAMBA,
HOJA MICHELIN.